April 5, 1960     R. B. TEMPLE     2,931,682
QUICK ACTING TRACTOR WHEEL CLAMP
Filed May 14, 1956     3 Sheets-Sheet 1
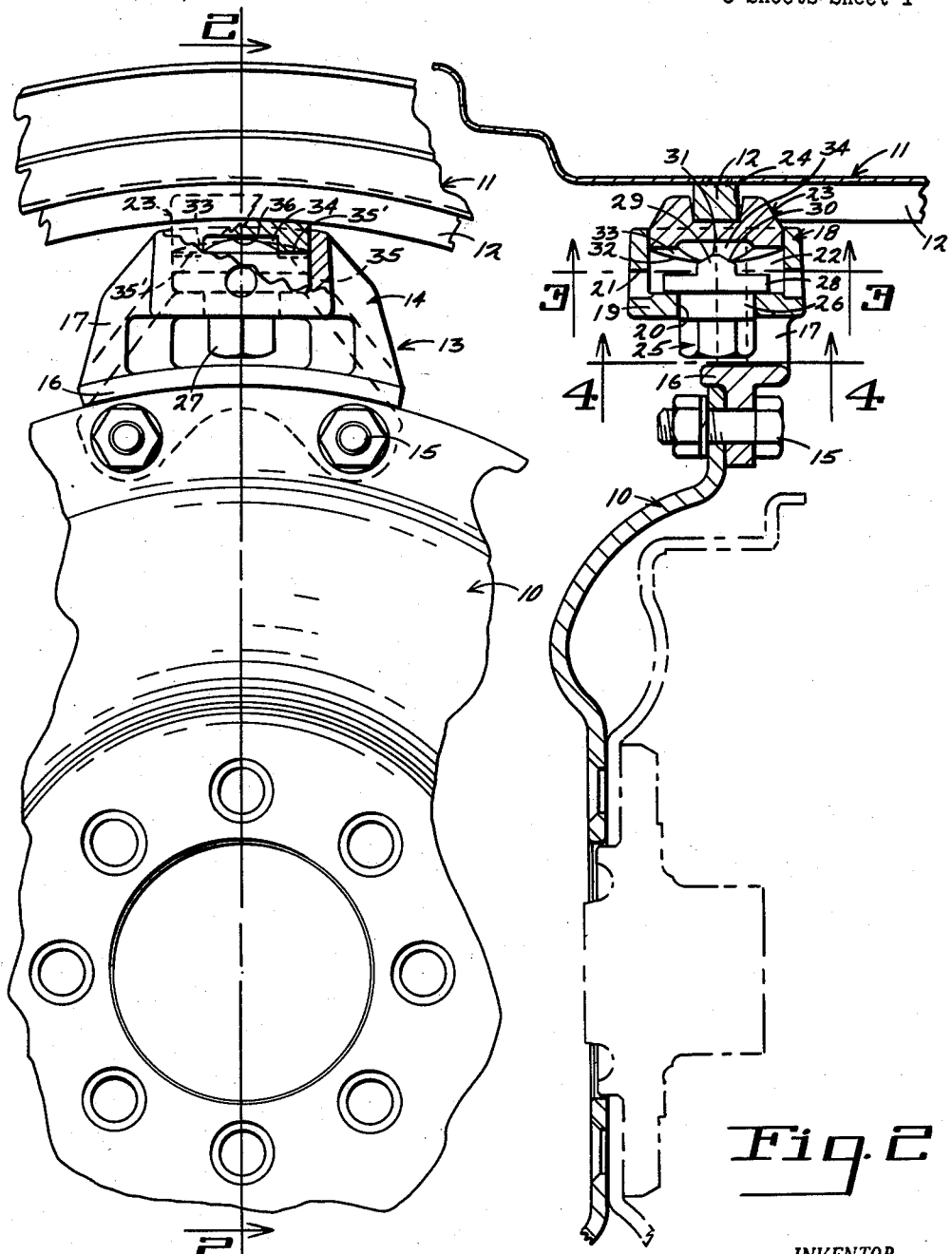
INVENTOR.
ROBERT B. TEMPLE.
BY Whittemore, Hulbert,
Belknap April 5, 1960  R. B. TEMPLE  2,931,682
QUICK ACTING TRACTOR WHEEL CLAMP Filed May 14, 1956  3 Sheets-Sheet 2

INVENTOR.
ROBERT B. TEMPLE.
BY *Whittemore, Hulbert*
*Belknap*

April 5, 1960   R. B. TEMPLE   2,931,682
QUICK ACTING TRACTOR WHEEL CLAMP
Filed May 14, 1956   3 Sheets-Sheet 3
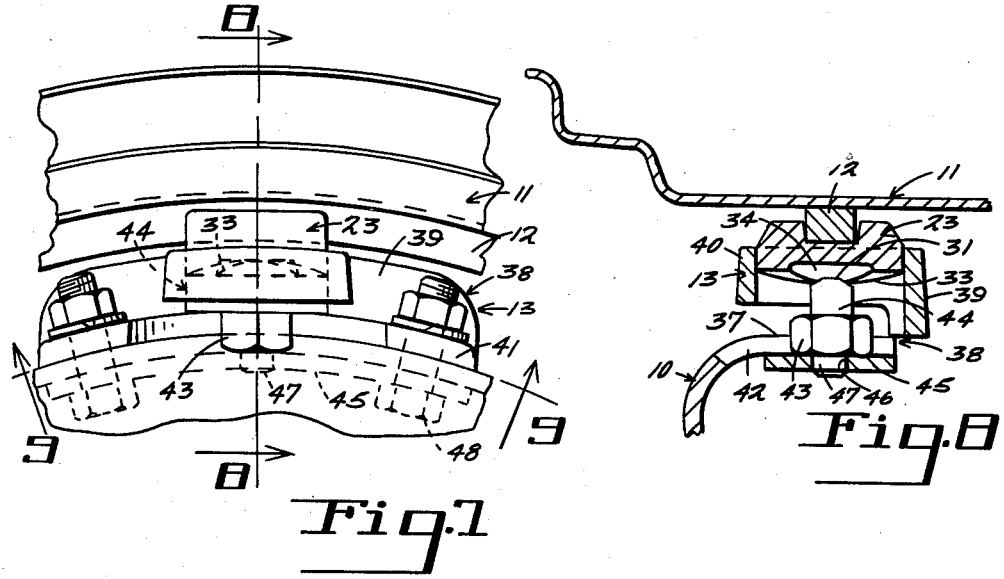
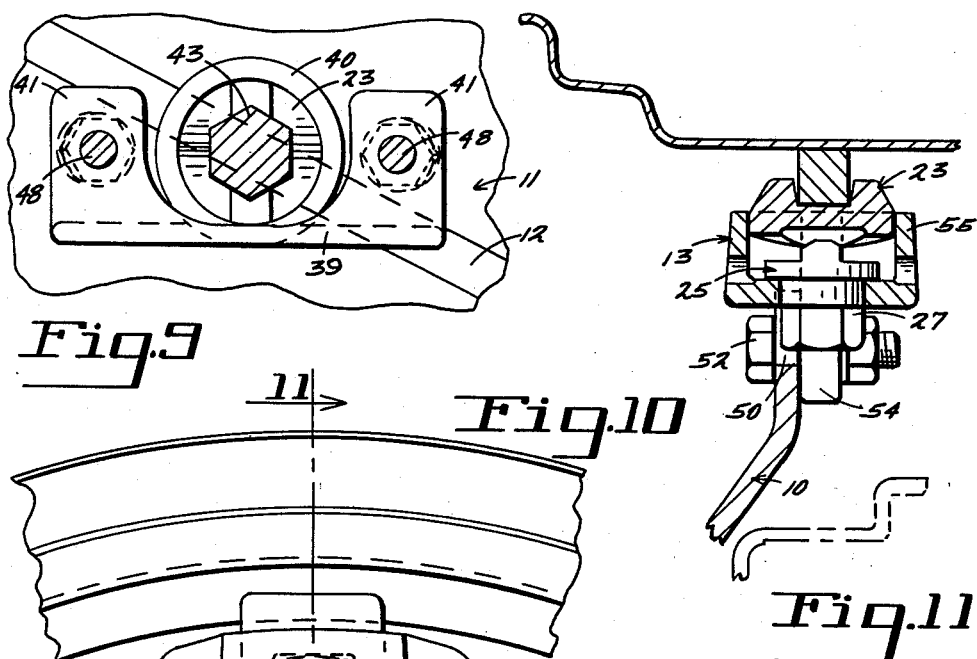
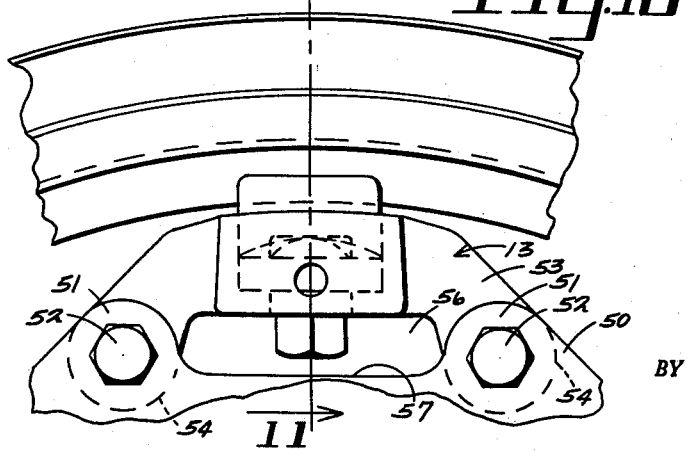
INVENTOR.
ROBERT B. TEMPLE.
BY Whittemore, Hulbert
Belknap 2,931,682
Patented Apr. 5, 1960

United States Patent Office

2,931,682
QUICK ACTING TRACTOR WHEEL CLAMP

Robert B. Temple, Detroit, Mich., assignor to Kelsey-Hayes Company, a corporation of Delaware Application May 14, 1956, Serial No. 584,558

5 Claims. (Cl. 301—9)

The present invention relates generally to improvements in an adjustable tread type wheel. In particular, the invention deals with a quickly releasable device for clamping the coaxial rim and wheel body of such a wheel in an adjusted relative position following relative rotation of the rim and wheel body to effect the adjustment.

It is an object of the invention to provide a quick operating clamp for a wheel of this character in which a rim clamping device, of which there are a number spaced circumferentially about the wheel body, includes a radially acting clamp element, this element also having camming engagement with an inclined rail on the rim to effect the aixal adjustment of the latter upon the described relative rotation of the wheel body and rim.

It is a further object of the invention to provide a clamp including a radially acting clamping element of the sort described which is individually guided for radial outward movement on the wheel body into expanding and clamping engagement with the rim, and an individual rotative actuator for this clamping element effective to engage it with the rim upon a 90° rotative manipulation of the actuator. The element is disengaged to release the rim by a further 90° manipulation of the actuator.

More specifically, it is an object of the invention to provide a quick acting clamp suitable for use with various types of wheel body mounting provisions, which includes a radially acting rim rail clamping and camming member having a special annular cam surface on its radially inner side engaged by an actuator rotatable on a radial axis on the wheel body. The arrangement is such that a fractional turn of the actuator, not in excess of 90°, suffices to accomplish the desired release or reclamp movements of the clamping member.

The foregoing as well as other objects will be made more apparent as this description proceeds, especially when considered in connection with the accompanying drawings, wherein:

Fig. 1 is a fragmentary elevational view of the outboard side of an improved adjustable tread wheel embodying a quick acting clamp in accordance with one embodiment of the invention, the clamp being shown in rim engaging and clamping position;

Fig. 2 is a fragmentary view in radial section along the line 2—2 of Fig. 1;

Figure 3:
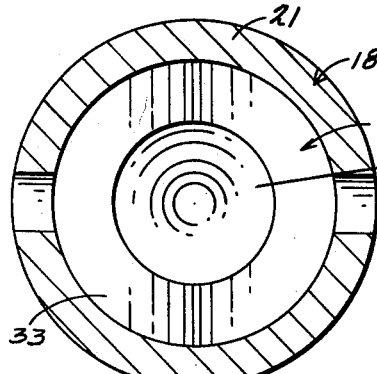
Figure 5:
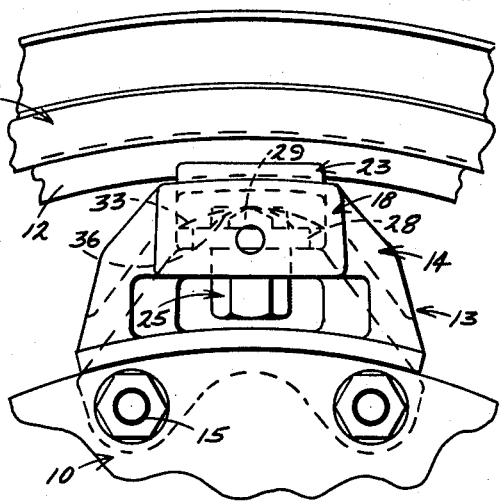
Figure 4:
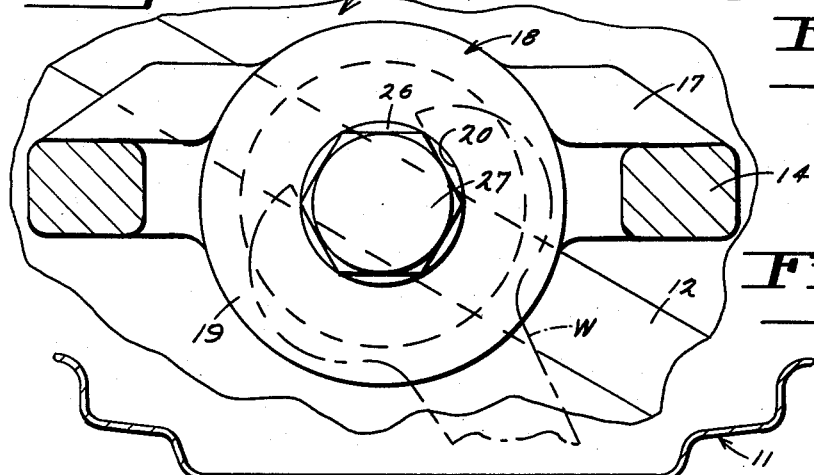
Figure 6:
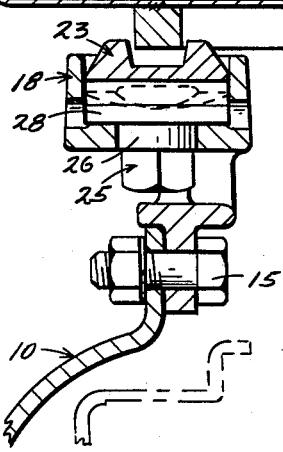

Figs. 3 and 4 are, respectively, views in horizontal section along lines 3—3 and 4—4 of Fig. 2;

Figs. 5 and 6 are fragmentary views in section similar to Figs. 1 and 2, respectively, but showing the clamp in a disengaged, rim-releasing position;

Fig. 7 is a fragmentary view in elevation similar to Fig. 1, illustrating a modified embodiment of the invention;

Figs. 8 and 9 are, respectively, fragmentary views in section along lines 8—8 and 9—9 of Fig. 7;

Fig. 10 is a fragmentary elevation similar to Fig. 7, showing still another modification; and Fig. 11 is a section along line 11—11 of Fig. 10.

Referring first to Figs. 1 through 6 of the drawings, the reference numeral 10 generally designates a conventional tractor wheel body of appropriately shaped cross section and circular outline, while the numeral 11 designates a wheel rim equipped with a series of circumferentially spaced, axially inclined camming rails 12 welded or otherwise secured about its inner peripheral surface.

A number of the improved clamps 13 of the invention, one for each rail, are mounted in circumferentially spaced relation about the periphery of wheel body 10; and it is the function of the clamps 13 to cammingly engage the respective rails 12 to cause an axial shifting adjustment of the rim 11 relative to wheel body 10 upon relative rotation of these parts. For this adjustment the clamp is actuated to its released position of Figs. 5 and 6. In order to rigidly secure the rim and wheel body together in their adjusted position the clamp 13 is actuated to its rim clamping position as depicted in Figs. 1, 2 and 3.

Each clamp 13 comprises a rigid mounting bracket 14 bolted at 15 to the wheel body margin, with a portion of a T-flange 16 of the bracket axially overlapping the margin in radially abutting engagement therewith. As shown in Fig. 1, the flange 16 is in circumferential conformity with the circular margin of wheel body 10.

Bracket 14 is stiffened by integral angled ribs 17, which sustain an integral, cup-like clamp guide socket 18 in radially outwardly spaced relation to the flange 16 of the bracket. The socket 18 comprises an inner base disk 19 having a central circular aperture at 20 and an annular, radially outwardly extending guide wall or flange 21 of circular cross section. The wall 21 peripherally defines a cylindrical socket recess 22 which opens radially outwardly of the wheel body 10.

The reference numeral 23 designates a clamping jaw or disk of circular outline, hereinafter described in greater detail, which is received in the space 22 for radial floating movement. Jaw 23 has a groove 24 across the center of its radially outermost surface, the slightly inclined inner walls of which groove straddle the rim rail 12, acting as a guide to cause axial shift of the rim 11 upon rotation of wheel body 10 relative thereto. The disk 23 also serves as a clamping or locking element releasably engaging the rail 12 to secure the rim 11 in the adjusted position by its outward radial clamping thrust against rim rail 12. The radial rail engaging and releasing movements of the jaw disk 23 are controlled by a manually operable actuator 25.

Actuator 25 has a cylindrical intermediate waist portion 26 rotatably received in the socket aperture 20, an inner hex head 27 to receive a wrench W for turning the actuator, an annular flange 28 to sustain the actuator on the socket base 19, and a radially outer camming nose 29. The length of nose 29 equals the diameter of jaw disk 23; and the nose is tapered at 30 across its width to afford a flat thrust or bearing portion 31 of less width.

The radially innermost, circular face 32 of the floating clamp jaw 23 is specially contoured to an annular camming surface 33 surrounding a central circular relief recess 34 in the face 32. Surface 33 is a warped one, in the diametral sense. That is, it blends spirally and circumferentially between a pair of 180° opposed, horizontal locking zones or "highs" at 35, and in doing so passes through the pair of diametrically opposed releases zones or "lows" 36, spaced 90° from the "highs." The relief recess 34 insures that the cam surface 33 is slidably engaged only by the ends of the nose bearing portion 31 as the actuator 25 is turned 90°, for example to engage nose 29 with "lows" 36. It thus releases rim 11 for adjustment. A further 90° manipulation of actuator 25 (in either direction) re-engages it with the "highs"

35 and causes jaw 23 to expand against rail 12 and reclamp the rim.

Flat and slightly recessed seats 35' are preferably formed at the diametrically opposed "high" zones 35 of cam surface 33 to stabilize the engagement of the actuator with the jaw and prevent inadvertent releasing movement of the actuator 25.

Furthermore, it is to be noted by reference to Figs. 1 and 4 that the side clearance between the actuator hex head 27 and the two ribs 17 of the mounting bracket 14, between which ribs the hex head is received, just accommodates the wrench W, with little room to spare. The location and spacing of the ribs is such that an approximate 90° turn of the wrench brings its shank from one rib to the other. Hence the operator is assisted in applying and manipulating the tool to obtain the proper degree of rotation of actuator 25. The clamp is shown in its released condition in Figs. 5 and 6, and is restored to the clamped locked condition of Figs. 1 and 2 in the manner described. In this position the ends of the actuator nose portion 31 pass into the seats 35' of cam "highs" 35, with the clamp jaw 23 still exerting sufficient outward force on rim 11 to prevent relative rotation of the latter.

The embodiment shown in Figs. 7 through 9 and Figs. 10 and 11 differ from the form just described solely in details of the mounting of the clamp to the wheel body.

Since many of the details of the clamp 13, shown in Figs. 1 through 6, are carried out without substantial change in the two modifications, corresponding details will be designated by corresponding reference numerals and further description thereof will be dispensed with.

As shown in Figs. 7, 8 and 9, the wheel body 10 has an axially extending outer flange 37 on which the clamp 13 is mounted. Accordingly, a special mounting bracket designated 38, is provided for the clamp. It includes an inner, radially outwardly extending flange 39 on which a cylindrical wall 40 concentrically receiving the circular clamping disk or jaw 23 is integrally formed, as well as axially outwardly extending lug portions 41 which overlap the wheel body flange 37.

The flange 37 is cut away at 42 to afford access to a hex shaped wrench receiving head 43 on a rotatable actuator 44. Actuator 44 is functionally identical to the actuator 25. A rigid arcuate strap 45, centrally apertured at 46 to receive and pilot an inner bearing 47 on the actuator 44 is applied to the lower surface of the flange 37, bridging the cut away portion 42. Bolts or studs 48 extend through the strap 45 and bracket lugs 41 to clamp the bracket 38 in place on the wheel body. The operation of the clamp shown in Figs. 7, 8 and 9 in releasing and relocking the rim 11 is identical to the operation described in connection with Figs. 1 through 6.

Fig. 10 and 11 of the drawings deal with a further modification of the invention for incorporation with a wheel body 10 which is of non-circular outline, featuring straight chord-like margins 50. Margins 50 terminate in spaced attaching bosses or ears 51 which are apertured for the reception of mounting bolts 52. In this case, the mounting means for the clamp 13 take the form of a bracket 53 bridging the space between adjacent bolt receiving ears 51. Bracket 53 is of inverted U-shape and is provided with terminal bosses or ears 54 which receive the bolts 52. An annular, axially outwardly extending wall 55 is integral with and centered on the bracket 53, providing the radially outwardly opening cylindrical space in which the clamp jaw 23 and actuator 25 are received.

The actuator 25 of Figs. 10 and 11 is substantially identical to that shown in Figs. 1 through 6, and its wrench receiving extremity 27 is exposed for access in a space 56 marginally defined between the radially inner edge of bracket 53 and the outer edge 57 of the mounting plate between its spaced ears 51.

What I claim as my invention is:

1. An adjustable tread wheel comprising a wheel body, a coaxial rim having an axially inclined cam rail on the inner periphery thereof, and rim clamping means coacting with said rail, including a jaw mounted on and movable radially outwardly of said wheel body into clamping engagement with said rim, said jaw having portions cammingly engageable with opposite axial sides of said rim rail, and an actuator mounted for rotation on said wheel body about a generally radial axis, said jaw having a radially inwardly facing annular cam surface engaged by said actuator upon rotation of the latter to cause radial displacement of the jaw in opposite directions, said cam surface including high and low portions spaced not in excess of 90° from one another about the annular outline of the surface.

2. An adjustable tread wheel comprising a wheel body, a coaxial rim having an axially inclined cam rail on the inner periphery thereof, and rim clamping means coacting with said rail, including a jaw mounted on and movable radially outwardly of said wheel body into clamping engagement with said rim, said jaw having portions cammingly engageable with opposite axial sides of said rim rail, a bracket secured on said wheel body and defining an outwardly opening space receiving said jaw for radial floating movement, and an actuator mounted by said bracket for rotation on said wheel body about a generally radial axis, said jaw having a radially inwardly facing annular cam surface engaged by said actuator upon rotation of the latter to cause radial displacement of the jaw in opposite directions, said cam surface including high and low portions spaced not in excess of 90° from one another about the annular outline of the surface.

3. An adjustable tread wheel comprising a wheel body, a coaxial rim having an axially inclined cam rail on the inner periphery thereof, rim clamping means including a clamping element mounted on said wheel body in clamping engagement with said rail, and an actuator mounted on said wheel body radially inwardly of said clamping element for rotation about a generally radial axis, said clamping element being radially displaceable on said wheel body between inner and outer positions and having on its radially inner end a radially inwardly facing annular cam surface engaged by the radially outer end of said actuator, said cam surface having angularly spaced high and low portions cooperable with said outer end of said actuator in predetermined positions of rotation of said actuator to radially position said clamping element in said inner and outer positions.

4. An adjustable tread wheel comprising a wheel body, a coaxial rim having an axially inclined cam rail on the inner periphery thereof, rim clamping means including a clamping element mounted on said wheel body in clamping engagement with said rail, and an actuator mounted on said wheel body radially inwardly of said clamping element for rotation about a generally radial axis, said clamping element being radially displaceable on said wheel body between inner and outer positions and having on its radially inner end a radially inwardly facing annular cam surface engaged by the radially outer end of said actuator, said cam surface having angularly spaced high and low portions cooperable with said outer end of said actuator in predetermined positions of rotation of said actuator to radially position said clamping element in said inner and outer positions, said high portion of said cam surface having a seat engageable with said actuator for releasably holding the same against accidental rotative movement.

5. An adjustable tread wheel comprising a wheel body, a coaxial rim having an axially inclined cam rail on the inner periphery thereof, rim clamping means including a clamping element mounted on said wheel body in clamping engagement with said rail, and an actuator element mounted on said wheel body radially inwardly of said clamping element for rotation about a generally radial axis, said clamping element being radially displaceable on said wheel body between inner and outer positions, the adjacent ends of said elements engaging one another and one of said ends being in the form of an annular cam surface having angularly spaced high and low portions cooperable with the other of said ends in predetermined positions of rotation of said actuator element to radially position said clamping element in said inner and outer positions.

References Cited in the file of this patent

UNITED STATES PATENTS

| | | |
|---|---|---|
| 1,208,222 | Skillin | Dec. 12, 1916 |
| 1,227,995 | Cameron | May 29, 1917 |
| 1,415,938 | Lott | May 16, 1922 |
| 2,254,361 | Frudden | Sept. 2, 1941 |
| 2,417,139 | Strehlow | Mar. 11, 1947 |
| 2,793,913 | Stough | May 28, 1957 |